United States Patent
Asnani et al.

(10) Patent No.: US 10,227,676 B2
(45) Date of Patent: Mar. 12, 2019

(54) PROCESS OF SOLVENT EXTRACTION FOR SEPARATION OF RARE EARTH ELEMENTS (REES) THROUGH PARTIAL REFLUX OF RARE EARTHS IN SOLVENT BASED ON SEPARATION FACTOR

(71) Applicant: Indian Rare Earths Limited, Mumbai (IN)

(72) Inventors: Chandru Kumar Asnani, Mumbai (IN); Padmanabhan Narayanan, Kochi (IN); Surya Kumar Siddhani, Kochi (IN); Deependra Singh, Mumbai (IN)

(73) Assignee: Indian Rare Earths Limited, Prabhadevi, Mumbai (IN)

( * ) Notice: Subject to any disclaimer, the term of this patent is extended or adjusted under 35 U.S.C. 154(b) by 0 days.

(21) Appl. No.: 15/649,902

(22) Filed: Jul. 14, 2017

(65) Prior Publication Data

US 2018/0142320 A1    May 24, 2018

(30) Foreign Application Priority Data

Nov. 21, 2016    (IN) .............................. 201621039660

(51) Int. Cl.
| | | |
|---|---|---|
| *C22B 3/00* | (2006.01) |
| *C22B 3/26* | (2006.01) |
| *C22B 59/00* | (2006.01) |
| *B01D 11/04* | (2006.01) |

(52) U.S. Cl.
CPC ............ *C22B 3/0005* (2013.01); *B01D 11/04* (2013.01); *C22B 59/00* (2013.01)

(58) Field of Classification Search
CPC ................. C22B 59/00; C22B 3/0005–3/0097
USPC ...................................... 423/21.5, 21.1, 263
See application file for complete search history.

(56) References Cited

U.S. PATENT DOCUMENTS 3,821,352 A * 6/1974 Gaudernack ........ C01F 17/0006
423/21.5

FOREIGN PATENT DOCUMENTS

| GB | 1026791 | * | 4/1966 |
| GB | 1185810 | * | 3/1970 |

* cited by examiner

*Primary Examiner* — Steven J Bos
(74) *Attorney, Agent, or Firm* — The Webb Law Firm

(57) ABSTRACT

A process of solvent extraction for separation of rare earth elements (REEs) based on separation factor is provided. The method includes repeatedly contacting the REEs containing aqueous solution with a suitable solvent containing a diluent and/or a modifier and an REE as a partial reflux.

3 Claims, 3 Drawing Sheets

PROCESS OF SOLVENT EXTRACTION FOR SEPARATION OF RARE EARTH ELEMENTS (REES) THROUGH PARTIAL REFLUX OF RARE EARTHS IN SOLVENT BASED ON SEPARATION FACTOR

CROSS-REFERENCE TO RELATED APPLICATION

This application claims priority to Indian Patent Application No. 201621039660 filed Nov. 21, 2016, the disclosure of which is hereby incorporated in its entirety by reference.

BACKGROUND OF THE INVENTION

Field of the Invention

The present invention relates to a process of Solvent extraction for separation of rare earth elements (REEs) based on separation factor.

Description of Related Art

Rare earth elements (REEs) comprise seventeen elements in the periodic table, specifically the 15 lanthanide elements plus scandium and yttrium. REEs are a group of metallic elements with unique chemical, catalytic, magnetic, metallurgical and phosphorescent properties, and as such find use in a wide variety of modern devices including high strength magnets, batteries, displays, lighting and high performance metal alloys.

REEs are relatively plentiful in the earth's crust. However, they are typically highly dispersed and are not often found as concentrated rare earth minerals in economically exploitable ore deposits. The extraction of REEs from mineral deposits is also challenging because mineral deposits containing REEs typically also contain appreciable levels of other rare elements that must be safely and economically separated from the REEs during processing of the ore. REEs are further categorized based upon their value and/or their molecular weight. As used herein, the term critical rare earth elements (CREE) includes neodymium (Nd), europium (Eu), terbium (Tb), dysprosium (Dy), praseodymium (Pr) and yttrium (Y). The term heavy rare earths (HREE) includes Tb, Dy, holmium (Ho), erbium (Er), thulium (Tm), ytterbium (Yb), lutetium (Lu) and Y. The term light rare earths (LREE) refers to lanthanum (La), cerium (Ce), Pr and Nd. Samarium (Sm), Eu and gadolinium (Gd) are collectively referred to herein as SEG.

Even though RE minerals are many in number, about 95% of all the world RE resources occur in just three minerals, bastnasite, monazite and xenotime. Bastnasite is a fluorocarbonate of the LREE group, monazite is a phosphate mainly of the LREE group, while xenotime is yttrium phosphate containing mostly of the HREE group. RE resource processing involves not only the operations that result in impurity removal, but also special operations that achieve the difficult task of separating the considerable number of naturally co-occurring RE elements from one another. The procedures used involve physical beneficiation to obtain RE mineral concentrate, which is subject to chemical breakdown, recovering the RE values and separating the individual REEs based on subtle and systematic differences in their basicity resulting from decrease in ionic radius from La to Lu. The basicity differences influence the solubility of salts, the hydrolysis of ions, and the formation of complex species. These properties form the basis of separation procedures by fractional crystallization, fractional precipitation, ion exchange, and solvent extraction (SX). In addition to a trivalent oxidation state, Ce, Pr and Tb can also occur in the tetravalent state, and Sm, Eu and Yb also exhibit bivalency. Selective oxidation or reduction of these elements is useful in effective separation because in the bivalent and tetravalent states the elements exhibit markedly different chemical behavior compared to that in the trivalent state.

$CeO_2$ accounts for 45-47% in monazite and about 50% in bastnasite. Removal of Ce by chemical processes before SX separation simplifies the other REE separation and significantly reduces the volume of the feed to the SX plant by almost 50%, thus reducing both the capital cost and the operation costs of the SX plant. Ce is readily oxidized to $Ce^{4+}$, which is stable in aqueous solution. Oxygen, chlorine, ozone, potassium permanganate, and hydrogen peroxide, as well as electrolytic oxidation, are the commonly used oxidants for Ce oxidation. $Ce^{4+}$ begins hydrolysis and precipitates as $Ce(OH)_4$ at pH 0.8, while other trivalent REEs are kept in solution due to their higher hydrolysis pH (6-8). The $CeO_2$ from the further treatment of $Ce(OH)_4$ product is of only 90% purity and can be sold as low quality polishing material in the glass industry.

Of the mentioned separation procedures, solvent extraction is most widely used for production of tonnage quantities of highly pure individual REEs. It depends on the preferential distribution of individual REEs (either in the cationic form or as complex anions or as neutral species) between two immiscible liquid phases that are in contact with each other. One of the liquid phases is an aqueous solution and the other is a non-aqueous organic phase. The organic phase used in solvent extraction usually consists of two or more substances. The extractant proper is responsible for collecting the RE species into the organic phase. However, the extract is usually too viscous to be used in a practical system. It is dissolved in suitable diluents such as kerosene or petrofin or the like to ensure a good contact with the aqueous phase. A substance known as a modifier, such as isodecanol or the like, is also usually added to the organic phase to improve the hydrodynamics of the system.

A schematic of the solvent extraction process is shown in FIG. 1. Usually the transfer of metal ions from aqueous phase to organic phase does not occur completely in one contact. Multiple contacts are necessary. This also holds true for scrubbing (contacting the loaded organic phase with an aqueous solution to collect back the impurities extracted by the solvent) and stripping (contacting the scrubbed organic phase with an aqueous solution to recover the main extracted species from the organic phase, back to the aqueous phase).

Numerous extractants have been used for analytical or experimental separation of REEs from one another, however, only a relatively few are used in industrial practice. They include cation exchange extractants such as organophosphorus acids and carboxylic acids, neutral extractants such as tri-n-butyl phosphate (TBP), and anion exchange extractants such as the amines, ionic liquids and a mixture of these extractants. Among these, the primary industrial extractants used for separation of REEs by solvent extraction are di-2-ethyl-hexyl phosphoric acid (HDEHP), 2-ethyl-hexyl-2-ethyl-hexyl phosphonic acid (EHEHPA), TBP, VERSATIC™ acid, VERSATIC™ 10, and ALIQUAT™ 336. These are listed in Table 1.

TABLE 1

| Extractant | Molecular formula |
|---|---|
| Tri-n-butyl phosphate (TBP) | $(C_4H_9O)_3PO$ |
| Di-2-ethyl-hexyl phosphoric acid (HDEHP) or D2EHPA | $(C_8H_{17}O)_2POOH$ |
| 2-ethyl-hexyl-2-ethyl-hexyl phosphonic acid (EHEHPA) Trade name: PC88A, Ionquest 801, P507 | $(C_8H_{17}O)C_8H_{17}POOH$ |
| Versatic acid | $(R_1 \cdot R_2 \cdot R_3) \cdot C \cdot COOH$ |
| Versatic 10 | $C_9H_{19}C \cdot COOH; (R_1 \cdot R_2 \cdot R_3 = C_8H_{19})$ |
| Trialkyl-methyl-ammonium chloride Trade name: Aliquat 336 | $R_3CH_3N^+Cl^-$ |

Of the above extractants, D2EHPA and PC88A are the most investigated cation exchange extractants. PC88A is preferred as an extractant for the separation of REEs due to the high separation factors between any two adjacent REEs compared to D2EHPA. Extraction by cation exchange involves most commonly the displacement of a hydrogen ion from the extractant by the extracted metal, resulting in the formation of an electrically neutral, organic soluble complex. To circumvent the increase in acidity due to the release of hydrogen ion, the extractant is saponified with NaOH. The degree of saponification is restricted, however, to avoid gel formation due to excessive loading of REEs and to avoid solubility of saponified solvent in the aqueous phase. The organic phase typically containing 1.5 M PC88A in kerosene and containing 5% (v/v) isodecanol, after 35% saponification with NaOH is used for extraction of REEs from a chloride aqueous solution. Separation factors ($\beta$) for LREEs in 1.5 M PC88A in kerosene with 35% saponification at aqueous pH 3-4 is given in Table 2:

TABLE 2

| $\beta_{Ce/La}$ | $\beta_{Pr/Ce}$ | $\beta_{Nd/Pr}$ | $\beta_{Nd/La}$ | $\beta_{Pr/La}$ |
|---|---|---|---|---|
| 4.0 | 2.0 | 1.5 | 12.0 | 8.0 |

Solvent extraction scheme for separation of REEs involves upfront partitioning of the REEs into three categories namely, LREEs, SEG and HREEs before fractionating each category into the individual REEs. Saponified PC88A is contacted with MRECL when the HREE are extracted by the solvent leaving the LREE in the raffinate. The loaded extract is scrubbed with HCl to remove any co-extracted LREEs. The scrubbed extract is stripped with dilute HCl to get Sm—Gd fraction and the extract is further stripped with concentrated HCl to get the HREE fraction. The LREE, SEG and HREE fractions are then subjected to further cycles of solvent extraction to yield individual REEs. For example, LREE fraction consisting of La, Ce, Nd and Pr is treated as shown in the schemes of FIG. 3A and FIG. 3B.

The most challenging of all RE separations is the partitioning of Nd/Pr and Pr/Ce as their separation factors are very low. Allowing a portion of the product to provide external reflux, as shown in FIG. 2, permits the extract leaving the scrubbing section to be further enriched in the product. This is analogous in its essentials to distillation. Thus, during Nd/Pr separation, the product Nd obtained after stripping the extract is partially refluxed in the scrubbing section, thereby further enriching extract in Nd. Likewise, during Pr/Ce separation, the product Pr obtained after stripping the extract is partially refluxed in the scrubbing section, thereby further enriching the extract in Pr.

In a multi-component REE system, though the REE product obtained by partial reflux of the REE in aqueous stream in scrubbing section is pure, the raffinate from the extraction section contains the remaining REEs, which need to be passed through number of solvent extraction stages for further fractionation. For example, LREE fraction containing La, Ce, Pr and Nd, when subjected to partial reflux with Nd product solution, results in the extract getting enriched in Nd, while the raffinate contains La, Ce and Pr. As the separation factor of Pr/Ce is low, fractionation of Pr from Ce requires many additional extraction and scrubbing stages. As shown in FIG. 3A, the raffinate from the Nd separation section contains LaCePr, thus requiring 304 stages totally to produce separated La, Ce, Pr and Nd. Also, as shown in FIG. 3B, the raffinate from the NdPr separation section contains LaCePr, thus requiring 278 stages totally to produce separated La, Ce, Pr and Nd.

The cerium product of 90% purity produced by the chemical separation process is used for applications such as glass polishing, etc. The material for this application is being replaced with cheaper alternatives and thus the demand for 90% purity Ce has drastically reduced. Also, this low purity Ce also contains significant amount of Pr and also some amount of Nd, which are both CREEs and are expensive. This has led to discontinuing of the chemical separation process and thus cerium has to be purified by solvent extraction process, which necessitates the removal of Pr and Nd from LaCe raffinate to generate a high purity Ce product.

SUMMARY OF THE INVENTION

An object of the present invention is to propose a process of solvent extraction for separation of rare earth elements (REEs) based on separation factor.

Another objection of the present invention is to propose a solvent extraction method for separation of REEs wherein the number of separation stages is reduced drastically.

Still another object of the present invention is to propose a solvent extraction method which can eliminate the need of chemical processing for cerium separation prior to REEs solvent extraction operation.

According to this invention there is provided a process of solvent extraction for separation of rare earth elements (REEs) based on separation factor characterized in that the method comprises of multiple contacts of REEs containing aqueous solution with a suitable solvent containing a diluent and/or a modifier and along with a REE as a partial reflux.

In accordance with the present invention there is also provided in the method multiple contacts of REEs containing aqueous solution with a suitable solvent containing a suitable diluent and/or a suitable modifier and along with a suitable REE as a partial reflux.

DESCRIPTION OF THE INVENTION

Figure 1:
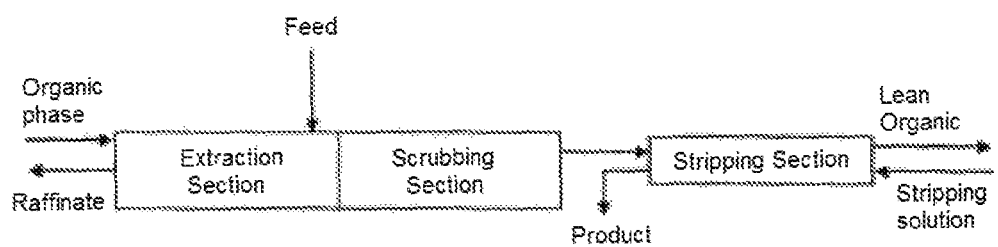
FIG. 1 is a schematic drawing of a solvent extraction process.
Figure 2:
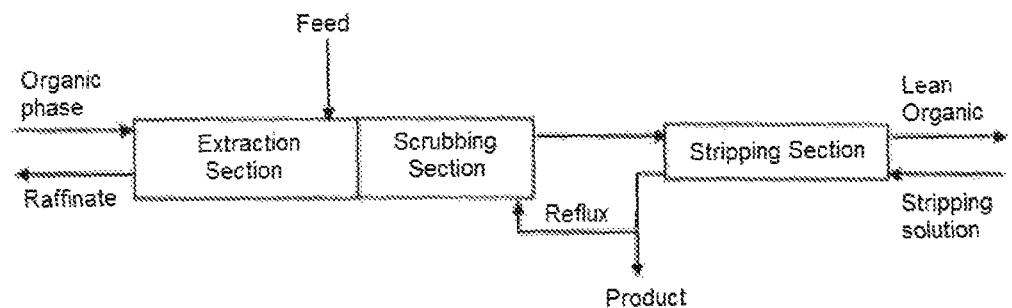
FIG. 2 is a schematic drawing of another solvent extraction process.
Figure 3A:
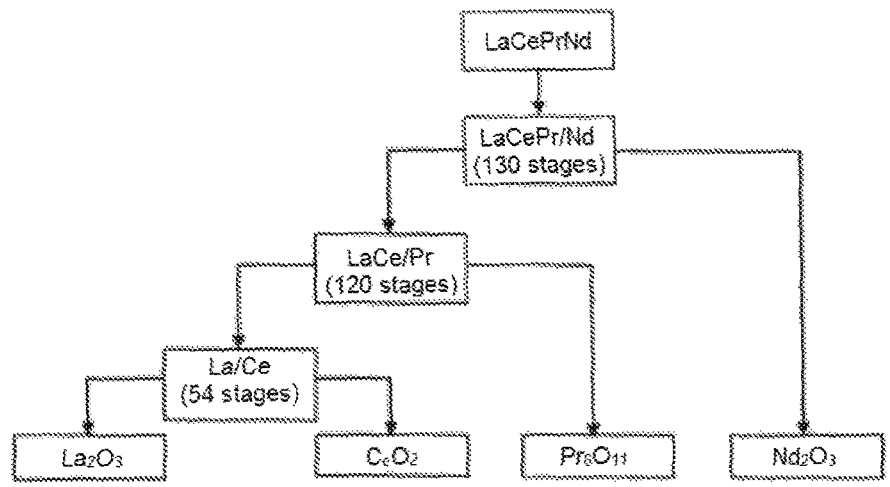
FIG. 3A is a schematic drawing of a solvent extraction process for light rare earths according to an aspect of the disclosure.
Figure 3B:
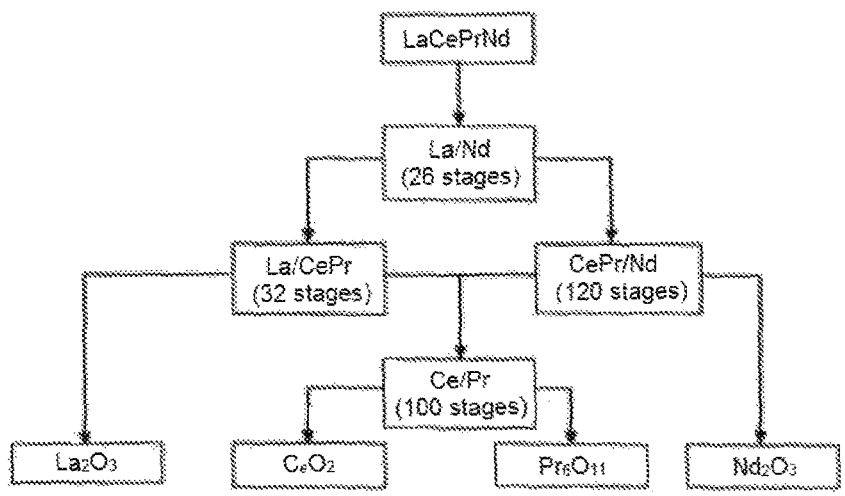
FIG. 3B is a schematic drawing of another solvent extraction process for light rare earths according to an aspect of the disclosure.
Figure 3C:
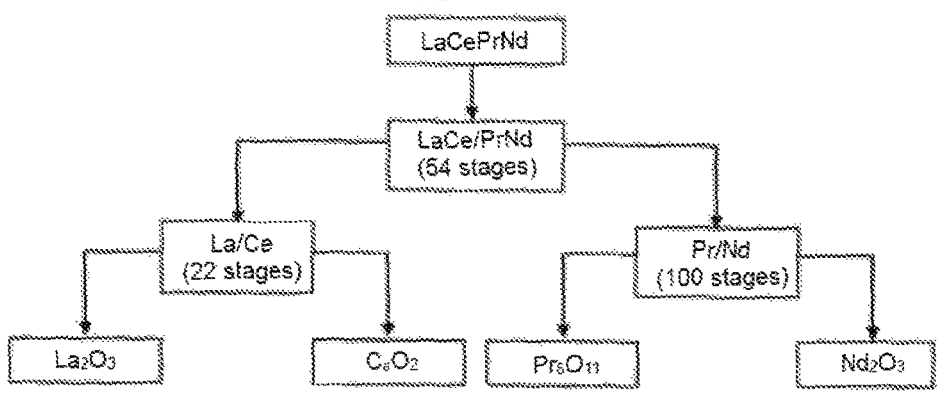
FIG. 3C is a schematic drawing of another solvent extraction process for light rare earths according to an aspect of the disclosure.

Conventionally, separation factors of adjacent REEs are the basis for solvent extraction process and equipment design for achieving their partitioning. It is seen that several adjacent REEs have low separation factors requiring large number of stages to achieve the desired separation. The objective of the separation is to eliminate the targeted RE with higher distribution coefficient from the raffinate, so that the raffinate can be further processed to recover the remaining REEs. It has now been found that refluxing the solvent with an REE having a lower distribution factor in relation to the targeted RE in the aqueous feed will result in elimination of the targeted RE from the raffinate. For example, Pr/Ce separation requires about 100 stages due to a separation factor of 2.0. During the extraction of LREE feed, the raffinate contains majorly La and Ce; however it also contains some amount of Pr due to the low separation factor of Pr/Ce. Removal of Pr from this stream is difficult requiring additional solvent extraction stages or alternatively, the raffinate has to be subjected to chemical processes to convert $Ce^{3+}$ to $Ce^{4+}$ for its removal. Refluxing the solvent with La before introduction of the solvent into the extraction section eliminates Pr from the raffinate, thereby generating a raffinate containing only La and Ce with only traces of Pr. La from the solvent is exchanged with Pr from the aqueous stream before the raffinate is discharged from the extraction section. This is based on the higher separation factor of 8.0 of Pr/La. As shown in FIG. 3C, the raffinate from the NdPr separation section contains only LaCe, thus requiring only 176 stages totally to produce separated La, Ce, Pr and Nd.

EXAMPLES

Example 1

The inland red sediment placer deposit in Ganjam District of Odisha State containing heavy minerals including the RE bearing mineral was subjected to water scrubbing, de-sliming and spiraling to recover heavy minerals. This heavy mineral concentrate was passed through a series of electrostatic separators namely, high tension roll separators and electrostatic plate separators and the resultant concentrate of non-conducting minerals was subjected to high intensity magnetic separation process to yield RE bearing mineral as the product. This was then reacted at high temperature (140° C.) with caustic lye for cracking the RE mineral, followed by water leaching and HCl acid dissolution to pH 3.0 to produce mixed rare earth chloride (MRECL) of the following RE composition: $CeO_2$: 46.65%; $La_2O_3$: 22%; $Pr_6O_{11}$: 5.5%; $Nd_2O_3$: 20%; $Sm_2O_3$: 3.92%; $Y_2O_3$: 0.81%, Others: 1.12%.

This MRECL was taken for solvent extraction using PC88A (1.5 M) with kerosene as the diluent and isodecanol as the modifier, wherein in the first SX cycle, MRECL was fractionated into LREE, SEG and HREE fractions. The LREE fraction was subjected to a second cycle of SX using PC88A as the solvent with the above mentioned composition. Apart from LREE feed, the aqueous inlet to NdPr extraction section also contains the scrub raffinate from Ce scrubbing section. The SX scheme for LREE fractionation is shown in FIG. 4.

Figure 4:
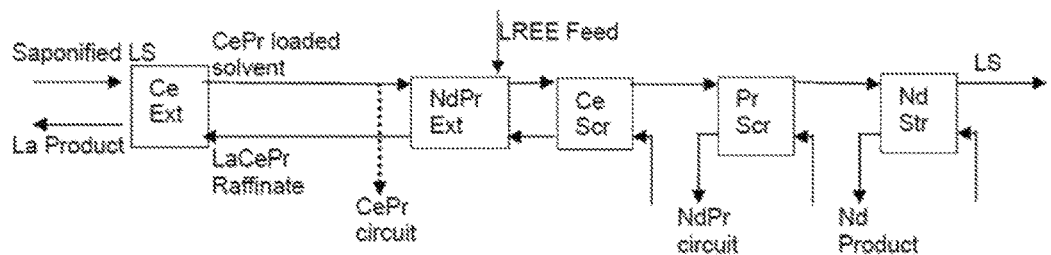
FIG. 4 is a schematic drawing of a process for fractionation of light rare earths according to an aspect of the disclosure.

As shown in FIG. 4, saponified solvent extracts Ce and Pr from the raffinate from NdPr extraction section and is then fed countercurrent to the NdPr extraction section, wherein the Nd, Pr and Ce from the LREE are extracted before the Ce and Pr removal in the Ce-scrubbing and Pr-scrubbing sections. Nd is stripped from the solvent before it is recycled as the lean solvent (LS). The stage-wise analysis of the extract and the raffinate from the NdPr extraction section is listed in Table 3.

TABLE 3

| Stage | TREO (g/l) | $La_2O_3$ (%) | $CeO_2$ (%) | $Pr_6O_{11}$ (%) | $Nd_2O_3$ (%) |
|---|---|---|---|---|---|
| O1 | 26.60 | 0.63 | 84.65 | 8.43 | 6.29 |
| O2 | 26.70 | 1.29 | 73.41 | 12.82 | 12.48 |
| O7 | 26.32 | 2.87 | 44.33 | 12.20 | 40.60 |
| O12 (Ext) | 27.53 | 2.80 | 38.59 | 8.78 | 49.83 |
| A1 | 211.94 | 20.61 | 55.94 | 5.60 | 17.85 |
| A6 | 195.3 | 19.93 | 59.32 | 6.97 | 13.78 |
| A11 | 199.16 | 20.57 | 71.63 | 5.60 | 2.20 |
| A12 (Raff) | 200.72 | 21.39 | 75.11 | 3.29 | 0.21 |

The O & A stages listed in column 1 at Table 3 are organic and aqueous outlet streams from the respective stages. 1 is the entry stage, while 12 is the exit stage for the streams. A12 is the raffinate, while O12 is the extract. A12 contains a significant amount (3.29%) of Pr. It also contains 0.21% Nd. This means that after La extraction from the raffinate, CePrNd separation would require a separate solvent extraction cycle to produce Ce of >99% purity.

Example 2

Keeping all the processes and parameters given in the example 1) unchanged, the LREE fraction (along with Ce scrub raffinate) was subjected to a second cycle of SX using PC88A as the solvent but the PC88A solvent to NdPr extraction section was preloaded with La. The scheme for the SX is shown in FIG. 5.

Figure 5:
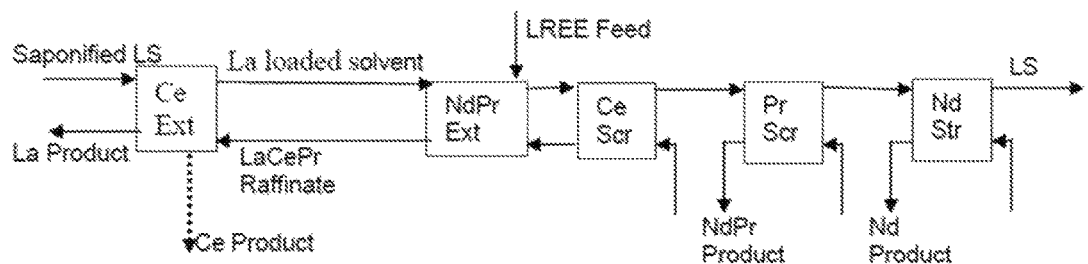
FIG. 5 is a schematic drawing of another process for fractionation of light rare earths according to an aspect of the disclosure.

As shown in FIG. 5, saponified solvent containing La from a suitable stage in the Ce extraction section is drawn and is then fed countercurrent to the NdPr extraction section, wherein the Nd, Pr and Ce from the LREE are extracted before Ce and Pr removal in the Ce scrubbing and Pr scrubbing sections. Nd is stripped from the solvent before it is recycled as the lean solvent (LS). The stage-wise analysis of the extract and the raffinate from the NdPr extraction section is shown in Table 4.

TABLE 4

| Stage | TREO (g/l) | $La_2O_3$ (%) | $CeO_2$ (%) | $Pr_6O_{11}$ (%) | $Nd_2O_3$ (%) |
|---|---|---|---|---|---|
| O1 | 29.7 | 18.01 | 79.55 | 1.97 | 0.27 |
| O2 | 30.22 | 15.51 | 80.93 | 2.95 | 0.41 |
| O7 | 30.22 | 1.24 | 82.66 | 11.7 | 4.2 |
| O12 (Ext) | 30.38 | 3.19 | 46.21 | 14.3 | 36.1 |
| A1 | 209.3 | 16.36 | 61.34 | 8.63 | 13.47 |
| A2 | 215.34 | 15.94 | 77.73 | 5.04 | 1.09 |

TABLE 4-continued

| Stage | TREO (g/l) | La$_2$O$_3$ (%) | CeO$_2$ (%) | Pr$_6$O$_{11}$ (%) | Nd$_2$O$_3$ (%) |
|---|---|---|---|---|---|
| A7 | 207.62 | 42.57 | 56.4 | 0.81 | 0.02 |
| A12 (Raff) | 212.1 | 65.11 | 34.79 | 0.1 | 0 |

The O & A stages listed in column 1 of Table 4 are organic and aqueous outlet streams from the respective stages. 1 is the entry stage, while 12 is the exit stage for the streams. A12 is the raffinate, while O12 is the extract. A12 contains only 0.1% Pr and nil Nd. This means that after La extraction from the raffinate, Ce product of >99% purity can be directly produced without any separate solvent extraction cycle for further cerium purification.

The invention claimed is:

1. A process of solvent extraction for separation of rare earth elements from an aqueous solution comprising the rare earth elements (REEs) based on a separation factor between each of the rare earth elements, the process comprising:
repeatedly contacting the aqueous solution comprising the rare earth elements with a solvent containing a diluent and/or a modifier and a partial reflux of a rare earth element having a lower distribution coefficient in relation to a targeted rare earth element to eliminate the targeted rare earth element from a raffinate of the aqueous solution comprising the rare earth elements.

2. The process as claimed in claim 1, wherein the targeted rare earth element is praseodymium, and wherein the partial reflux of the rare earth element reduces a number of separation solvent extraction stages required and eliminates a need of chemical processing for cerium separation prior to the solvent extraction for separation of the rare earth elements.

3. The process as claimed in claim 1, wherein the solvent comprises neutral phosphorus, acidic phosphorus, carboxylic acids, amines, ionic liquids, or any mixture thereof.

* * * * *